United States Patent [19]

Pajtas

[11] 4,211,285

[45] Jul. 8, 1980

[54] AGRICULTURAL METHOD AND IMPLEMENT

[76] Inventor: Michael S. Pajtas, 11575 Riley Rd., Flushing, Mich. 48433

[21] Appl. No.: 897,702

[22] Filed: Apr. 19, 1978

[51] Int. Cl.² .............................................. A01B 39/08
[52] U.S. Cl. .................................... 172/156; 172/509; 111/DIG. 1
[58] Field of Search ............... 172/156, 538, 508, 512, 172/513, 1, 509, 176, 159, 574, 155, 182, 153, 642, 701, 681; 111/DIG. 1, 85, 8, 1, 83

[56] References Cited

U.S. PATENT DOCUMENTS

| 1,298,047 | 3/1919 | Jackson | 172/574 |
|---|---|---|---|
| 1,563,291 | 11/1925 | Rasmussen | 172/512 |
| 1,901,299 | 3/1933 | Johnson | 172/538 X |
| 2,061,348 | 11/1936 | Cogdill | 111/83 |
| 2,635,520 | 4/1953 | Pugh | 172/182 |
| 2,712,783 | 7/1955 | Vaura | 172/512 |
| 2,734,439 | 2/1956 | Padrick | 172/156 |
| 3,023,717 | 3/1979 | Cline | 111/DIG. 11 |
| 3,177,830 | 4/1965 | Zimmerman | 172/538 X |

OTHER PUBLICATIONS

Buffalo–All Purpose Heavy Duty Cultivator Advertising Brochure of Fleisher Manuf. Inc., Columbus, Neb.

Primary Examiner—Richard J. Johnson
Attorney, Agent, or Firm—Barnes, Kisselle, Raisch & Choate

[57] ABSTRACT

A method and implement for facilitating and fostering the germination and sprouting of seeds of row crops, particularly under encrusted soil conditions, and eliminating the need for using herbicide for most common weeds in growing row crops by covering the rows of seeds with a layer of loose soil after the seeds have been sown in cultivated soil and prior to sprouting and emergence of the crop through the soil. Preferably each layer of loose soil has a generally convex cross-section with a slight depression directly over the row of seeds. The implement for forming the convex layer of loose soil has a pair of laterally spaced apart discs which break up into fine particles at least a portion of the soil on each side of the row of sown seeds and propel a portion thereof onto a deflector shield received between the discs and overlying the row of sown seeds which directs such particles into a layer of loose soil overlying the row of sown seeds.

5 Claims, 4 Drawing Figures

AGRICULTURAL METHOD AND IMPLEMENT

This invention relates to an agricultural method and implement for facilitating the germination and sprouting of row crops such as soybeans, kidney beans, corn and the like.

In accordance with this invention, when the seeds of a crop have been sown at their normal depth in laterally spaced apart rows in cultivated soil and prior to sprouting of the sown seeds through the soil, a layer of loose and relatively fine particles of soil is formed over each row of sown seeds. The layer of soil is formed over each row of sown seeds by breaking up a portion of the soil between the rows of seeds and depositing at least a portion thereof in a layer of soil over the rows of seeds. Preferably the layer of loose soil has a cross-section with a generally convex, triangular, or dome configuration preferably with a slight depression directly over the row of seeds. In cross-section the surface of the layer of loose soil tapers and slopes downwardly and away from the row of seeds on both sides thereof toward the level of the surface of the soil midway between the rows of sown seeds and has a maximum average depth of about 1 to 3 inches and at its base an average width of at least six inches and preferably 8 to 12 inches. Due to the depression the average depth of the layer of loose soil directly over the row of sown seeds is not more than about one inch and preferably about one-half inch.

Such a layer of loose soil can be formed by an implement having a pair of laterally spaced apart discs disposed on opposite sides of a row of sown seeds and arranged so that when traversed along the row they break up soil on each side of the row into fine particles and propel a portion of the fine particles onto a deflector shield received between the discs and overlying the row of sown seeds to direct such fine particles into a generally convex layer of loose soil overlying the row of sown seeds.

This layer of loose soil over a row of sown seeds facilitates the germination and sprouting of the seeds by retarding the growth of most common weeds over and immediately adjacent the row of sown seeds so that it is usually unnecessary to use any herbicides, provides a mulch which retards the loss of moisture from the soil, if formed over a hard crust of soil results in the softening of such hard crust thereby facilitating sprouting and emergence of the crop through the soil, improves drainage of water from excessive rain or irrigation away from the row of sown seeds, improves the effectiveness of a rotary hoe in breaking up encrusted soil over and immediately adjacent a row of sown seeds thereby facilitating sprouting and emergence of the crop through the soil, and permits the sown field to be tilled with a rotary hoe after a hard rain or excessive irrigation much sooner than can be done on a conventional sown field in which no convex layer of loose soil has been formed over the rows of sown seeds.

These and other objects, features and advantages of this invention will be apparent from the following more detailed description, appended claims, and accompanying drawing in which:

Figure 1:
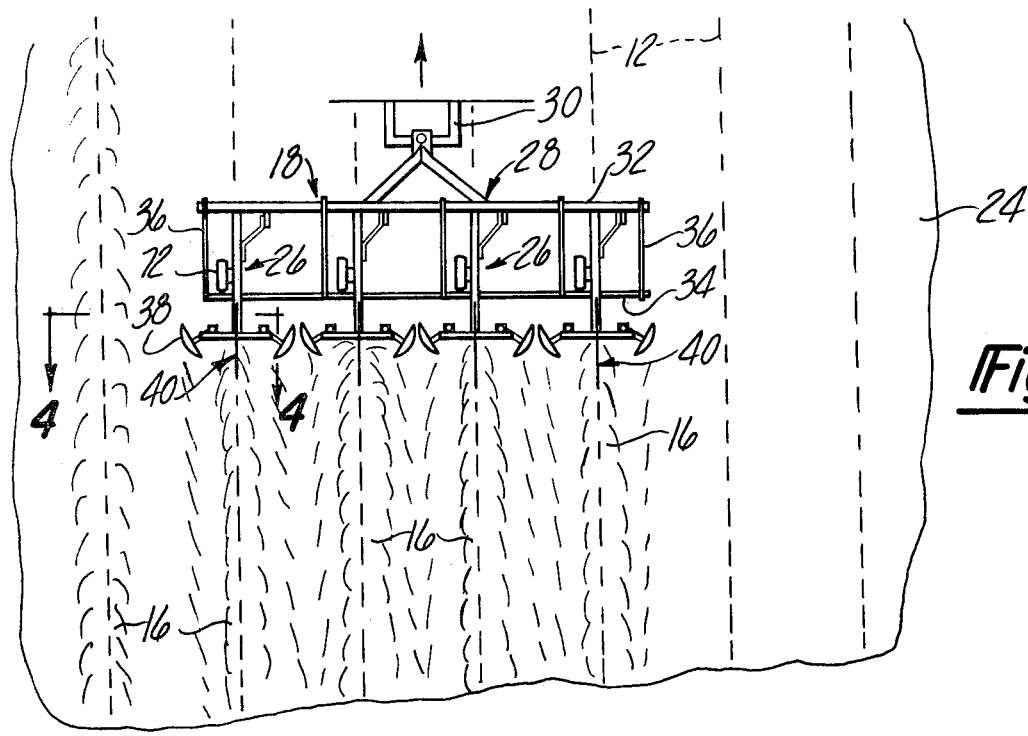
FIG. 1 is a plan view of a field of soybeans sown in rows being covered with a layer of loose soil by an implement drawn by a tractor in accordance with this invention.
Figure 4:
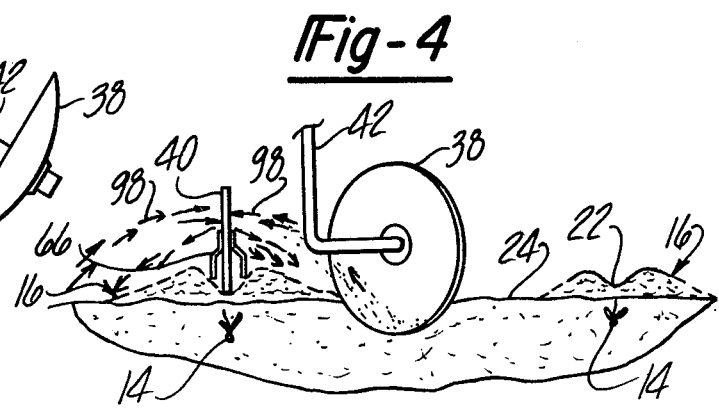
FIG. 4 is a fragmentary sectional view on line 4—4 of FIG. 1 illustrating a layer of loose soil being produced by the implement of FIG. 1 and the contour and cross-section of the layers of loose soil overlying rows of sown seed in accordance with this invention.

Referring in more detail to the drawing FIG. 1 shows a cultivated field 10 with a plurality of laterally spaced apart rows 12 of recently sown soybeans 14 (FIG. 4) being covered with a layer of loose soil 16 by an implement 18 in accordance with this invention which is drawn over the field by a tractor 20. Implement 18 breaks up the soil between sown rows 12 into relatively fine particles and deposits a portion thereof over the row in a layer 16 of loose soil extending longitudinally over the row and having a generally convex, triangular or dome shaped cross-section (FIG. 4) preferably with a slight depression 22 essentially directly over the row of sown seeds. Depression 22 facilitates emergence through the soil of sprouts of the sown seeds by making the depth of the layer of loose soil directly over the row of seeds substantially less than the maximum depth of the layer of loose soil.

As previously mentioned, preferably the maximum height of the layer of loose soil 16 is on the average about one inch to three inches above the surface 24 of the generally flat cultivated field 10 prior to formation of the layer of loose soil. Preferably, the overlying layer of loose soil 16 tapers downwardly or falls away on both sides of depression 22 and at its base is on the average at least six inches wide, and preferably eight to twelve inches wide. Preferably depression 22 has a maximum width of about two to three inches and is deep enough so that the height above the surface 24 of the loose soil directly over the sown seed is not greater than about one inch and preferably about one-half inch.

Implement 18 has a plurality of gangs 26 mounted on a frame 28 connected to a three point hitch 30 on tractor 20. To permit the gangs 26 to be engaged with and disengaged from the soil by lowering and raising the hitch, each gang 26 is pivotly connected to a tool bar 32 of frame 28 and a lift bar 34 extends under all of the gangs and is rigidly secured to tool bar 32 by links 36 fixed adjacent their ends to the bars.

Figure 3:
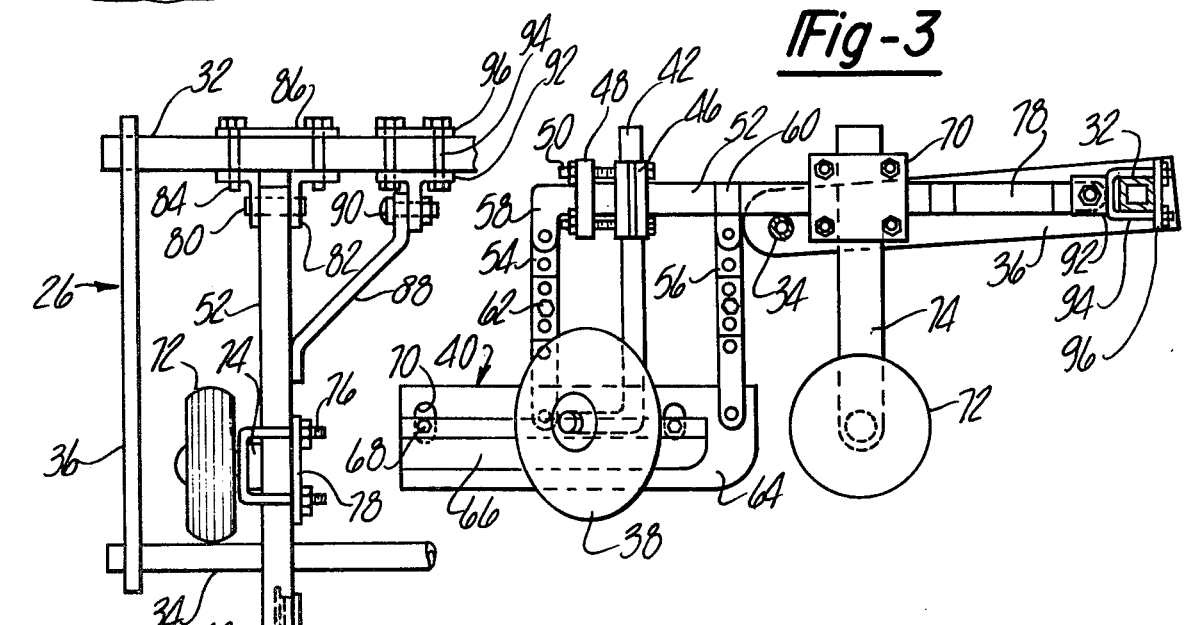
FIG. 3 is an enlarged fragmentary side view of one of the gangs of the implement of FIG. 1.
Figure 2:
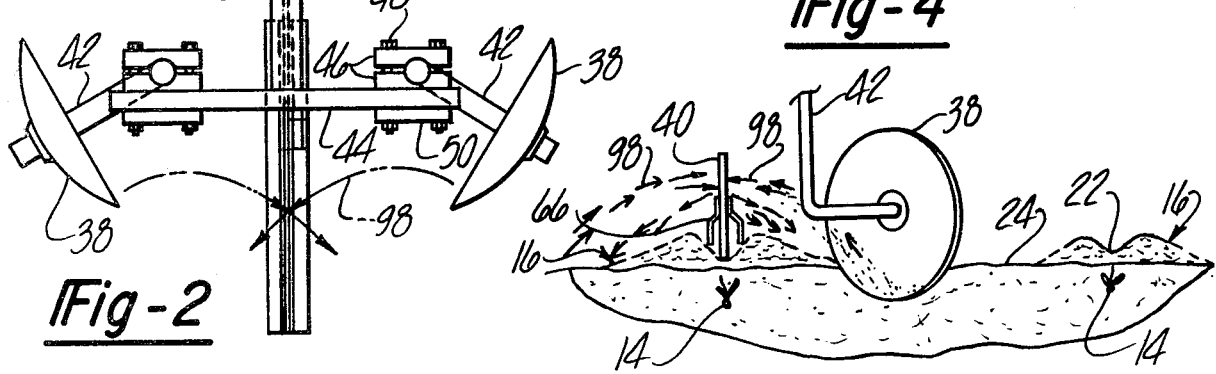
FIG. 2 is an enlarged fragmentary top view of one of the gangs of the implement of FIG. 1.

As shown in FIGS. 1 through 3 each gang 26 of implement 18 has a pair of discs 38 which break up a portion of the soil between the rows 12 of sown seed into relatively fine particles and propel a portion of the particles onto a deflector shield 40 to form the layer of loose soil 16 over the rows of sown seeds. The discs 38 are mounted for rotation on one leg of an L-shaped arm 42, the other leg of which is adjustably secured to a cross bar 44 by an assembly of a saddle block 46, through bolts 48, and a backing plate 50 received over the threaded end of the bolts. The cross bar 44 is fixed to one end of a carrier arm 52, the other end of which is pivotly connected to frame 26.

So that if in use of implement 18 the lower edge of shield 40 contacts the surface 24 of the field frame 28 of the implement will not be raised, the deflector shield 40 is mounted between the discs 28 by a parallelogram arrangement of arms 54 and 56 pivotly connected adjacent one end to the deflector shield and adjacent the other end to brackets 58 and 60 fixed to the carrier arm. To permit adjustment of its length, each pivot arm is in two overlapping sections, each having a plurality of equally longitudinally spaced holes therethrough and secured together by bolts and nuts 62. Deflector shield 40 has a main deflector plate 64 and a pair of auxiliary deflector fins 66 adjustably secured to plate 64 by bolts 68 extending through elongated slots 70 in the plate.

Carrier arm 52 is supported in part by a tire 72 mounted for rotation on a spindle fixed to the lower end of a support bar 74 which is adjustably secured to the carrier arm by a pair of U-shaped shackles 76 and a backing plate 78 received over their threaded ends. The carrier arm 52 of each gang 26 is pivotly attached to tool bar 32 of frame 28 by a pivot pin 80 carried by a pair of brackets 82 secured to the tool bar by a pair of U-shaped shackles 84 and a backing plate 86 received over their threaded ends. Carrier arm 52 is laterally stabilized by a reaction arm 88 fixed adjacent one end to the carrier arm and pivotly connected adjacent its other end to tool bar 32 by a pivot bolt 90 carried by a bracket 92 secured to the tool bar by U-shaped shackles 94 and a backing plate 96.

In using farm implement 18 to form a layer of loose soil 16 over rows 12 of sown seeds 14 the implement is moved generally longitudinally along the rows by tractor 20 with the frame 28 lowered sufficiently by hitch 30 so that lift bar 34 is disengaged from the carrier arms 52, tires 72 engage the field, the lower edge of each deflector shield 40 is normally about one half inch above surface 24 of the field and directly over a row 12, discs 38 extend into the soil of the field. As each gang 26 moves longitudinally along a row 12, discs 38 rotate in the soil adjacent each side of the row to break up at least a portion of such soil into relatively fine particles and propel (as indicated by arrows 98 in FIGS. 2 & 4) a portion of such relatively fine particles onto the deflector shield 40 which directs the particles into a layer of loose soil 16 with a generally convex cross-sectional shape with depression 22 substantially directly over the row 12 of sown seeds 14.

The contour and width of depression 22 can be varied by adjusting the position of the auxiliary deflector fins 66 relative to the lower edge of the main plate 64 of the deflector shield 40. The use of deflector fins 66 is optional although preferred and under many soil and moisture conditions a satisfactory layer of loose soil 16 can be produced with implement 18 by using deflector plate 64 without any auxiliary fins 66 thereon. The depth of the loose soil between the bottom of depression 22 and the surface 24 of the field can be varied by adjusting the height of the lower edge of the deflector shield above surface 24 of the field which is normally about one-half inch.

The deflector shield 40 also directs any stones and large lumps of dirt propelled onto the shield by the discs 38 away from the row of sown seeds and overlying layer of loose soil. The maximum height or depth of the layer of loose soil can be varied and controlled for differing soil and operating conditions by adjusting the angle at which discs 38 are inclined to the deflector plate and the depth to which the discs extend into the soil between the rows, which varies the quantity of small particles of loose soil propelled onto the deflector shield by the discs.

With normal soil and moisture conditions the implement 18 has operated successfully when moved along rows of seeds sown in cultivated soil at a rate of about four miles per hour with adjustment of the support wheels 72 and positioning of frame 28 so that the bottom edge of the deflector plate is normally about one half inch above the surface of the cultivated field, and the axis of rotation of each disc is inclined at an included angle of about 45 to 60 degrees to the shield with the lowermost portion of the edge of the disc extending about two to three inches into the cultivated soil. In such implement the discs 38 were about 14 inches in diameter and the shield was a flat generally rectangular steel plate about 8 inches by 24 inches by 1/16 inches with a curved lower leading edge having a radius of about four inches. This deflector shield was used without any auxiliary deflector fins.

In practice this invention has eliminated the use of herbicides in growing a crop of soybeans, retarded the growth of weeds during germination, sprouting and emergence of the crop through the soil, and facilitated and fostered the germination and sprouting of row crops, particularly under adverse weather conditions such as hard and excessive rain causing encrusting of the soil. In practice this invention improves the performance of a rotary hoe since it bears primarily on only the raised layers of loose soil, permits a rotary hoe to be used sooner after a heavy rain or excessive irrigation, and if the layer of loose soil is applied over encrusted soil results in softening of the encrusted soil, thereby facilitating emergence of the crop through the soil. In practice after the seeds have sprouted and emerged through the soil the growing crop is cultivated as needed with a conventional cultivator in the usual manner for the particular row crop.

I claim:

1. An apparatus for fostering the germination of crop seeds sown in rows in tilled soil and inhibiting the growth of weeds adjacent the sown seeds by depositing a layer of loose soil over and immediately adjacent the row of sown seeds prior to sprouting of the sown seeds, the apparatus comprising a frame, a deflector shield carried by said frame and having a generally flat plate constructed and arranged to overlie and extend generally vertically above and longitudinally of a row of sown seeds with its lower edge disposed closely adjacent the soil as the deflector shield is traversed generally longitudinally of the row of sown seeds, a pair of discs carried by said frame, disposed on opposite sides of said flat plate, and constructed and arranged to break up the soil adjacent both sides of the row of sown seeds and to propel at least a portion of the broken up soil onto each side of said flat plate such that at least a portion of the broken up soil is deflected by the deflector shield and deposited in a layer of loose soil overlying and adjacent the row of sown seeds as the frame is traversed generally longitudinally of the row of sown seeds.

2. The apparatus of claim 1 wherein the discs and the deflector shield are constructed and arranged such that the apparatus produces a layer of loose soil over the row of seeds having a generally convex cross-section with a depression essentially directly over the row of seeds, on the average a maximum width of at least six inches, and on the average a maximum height of at least about one inch.

3. The apparatus of claim 1 which also comprises a pair of auxiliary deflector fins disposed adjacent opposed sides of said flat plate and each having a portion laterally spaced from and extending generally longitudinally of said plate adjacent the lower edge thereof.

4. The apparatus of claim 1 which also comprises means carrying said flat plate on said frame such that when the apparatus is in use the lower edge of said flat plate can move generally up and down with respect to said frame in a generally vertical plane in response to variations in the generally vertical height between said frame and the portion of the soil underlying the lower edge of said flat plate.

5. The apparatus of claim 4 wherein said mounting means comprises at least two spaced apart links arranged in a parallelogram and each is pivotly connected with both said frame and said deflector plate.

* * * * *